United States Patent
Kurtz et al.

(10) Patent No.: US 8,191,424 B2
(45) Date of Patent: Jun. 5, 2012

(54) LOW DIFFERENTIAL PRESSURE TRANSDUCER

(75) Inventors: Anthony D. Kurtz, Saddle River, NJ (US); Nora Kurtz, legal representative, Saddle River, NJ (US); Lou DeRosa, Wayne, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/877,301

(22) Filed: Sep. 8, 2010

(65) Prior Publication Data

US 2010/0326199 A1  Dec. 30, 2010

Related U.S. Application Data

(63) Continuation-in-part of application No. 12/317,788, filed on Dec. 29, 2008, now Pat. No. 7,866,216, which is a continuation-in-part of application No. 12/070,255, filed on Feb. 14, 2008, now Pat. No. 7,743,662.

(51) Int. Cl.
  *G01L 9/06* (2006.01)
(52) U.S. Cl. .......................................... 73/721; 73/727
(58) Field of Classification Search .............. 73/700–756
  See application file for complete search history.

(56) References Cited

U.S. PATENT DOCUMENTS

| | | | |
|---|---|---|---|
| 3,739,315 A | 6/1973 | Kurtz et al. | |
| 4,104,924 A | 8/1978 | Caspar et al. | |
| 4,133,100 A | 1/1979 | Myhre | |
| 4,222,277 A | 9/1980 | Kurtz et al. | |
| 4,345,476 A * | 8/1982 | Singh | 73/720 |
| 4,370,890 A | 2/1983 | Frick | |
| 4,376,929 A | 3/1983 | Myhre | |
| 4,379,279 A * | 4/1983 | Nasiri | 338/42 |
| 4,787,251 A * | 11/1988 | Kolodjski | 73/755 |
| 5,088,329 A * | 2/1992 | Sahagen | 73/727 |
| 5,796,007 A | 8/1998 | Panagotopulos et al. | |
| 6,038,927 A * | 3/2000 | Karas | 73/706 |
| 6,279,401 B1 * | 8/2001 | Karas | 73/716 |
| 6,330,829 B1 | 12/2001 | Kurtz et al. | |
| 6,543,291 B1 | 4/2003 | Kurtz et al. | |
| 6,595,066 B1 | 7/2003 | Kurtz et al. | |
| 6,615,665 B1 | 9/2003 | Flogel et al. | |
| 6,813,953 B2 | 11/2004 | Baba et al. | |
| 7,743,662 B2 | 6/2010 | Kurtz | |

* cited by examiner

*Primary Examiner* — Andre Allen

(74) *Attorney, Agent, or Firm* — Troutman Sanders LLP; James E. Schutz; Jihan A. R. Jenkins

(57) ABSTRACT

It is an object of the present invention to provide a pressure transducer having a header wherein the header is comprised of a first section and a second section that are offset from each other. Each first and second section has a flexible diaphragm adapted to receive a first and second pressure, respectively. A central channel connects the diaphragms and a pressure sensor, located within the central channel, communicates with the channel and produces an output equal to the difference between the first and second pressures. The resultant device is a low differential pressure transducer which enables one to bring leads from the sensor out while having diaphragms of substantially the same size and diameter, therefore enabling the diaphragms to exhibit the same back pressure and be equally compliant.

19 Claims, 3 Drawing Sheets

LOW DIFFERENTIAL PRESSURE TRANSDUCER

RELATED APPLICATION

This Application is a continuation-in-part claiming priority under 35 U.S.C. §120 to U.S. patent application Ser. No. 12/317,788, entitled "LOW DIFFERENTIAL PRESSURE TRANSDUCER," filed Dec. 29, 2008, which is a continuation-in-part application claiming priority under 35 U.S.C. §120 to U.S. patent application Ser. No. 12/070,255, now U.S. Pat. No. 7,743,662, entitled "LOW DIFFERENTIAL PRESSURE TRANSDUCER," filed Feb. 14, 2008, and issued Jun. 29, 2010, all of which are incorporated by reference in their entirety as if fully set forth herein.

FIELD OF THE INVENTION

This invention relates to pressure transducers and more particularly to a low differential pressure transducer and header.

BACKGROUND OF THE INVENTION

A differential pressure transducer is a device which provides an output which is the difference between two input pressures. For example, when a pressure $P_1$ is applied to one face of a deflecting diaphragm and a pressure $P_2$ is applied to the other face of the deflecting diaphragm the resulting deflection will be determined by the difference in pressure (as for example $P_1-P_2$). There are other differential pressure transducers which essentially use two separate semiconductor structures. Each structure has its own diaphragm and the piezoresistors employed on the diaphragm surfaces are connected together to form a bridge which will provide a differential output. Reference is made to U.S. Pat. No. 6,595,066 entitled Stopped Leadless Differential Sensor issued on Jul. 22, 2003 to A. D. Kurtz, et. al. and assigned to the assignee herein. That patent shows a differential transducer where the pressure is applied to the top face or the top side of the diaphragm and to the bottom face or bottom side of the diaphragm to obtain a differential output. The patent shows a Wheatstone Bridge array consisting of piezoresistors which vary resistance according to the magnitude of a pressure or force applied to the diaphragm.

However, in prior art devices which utilize a force applied to two separate diaphragms, there is a problem in low pressure devices to bring out the leads. This problem resulting in one of the diaphragms of the differential transducer being smaller than the other diaphragm. In any event, it is known that the diaphragm size affects the operation of such a device. The larger the diaphragm, the less the back pressure, and the larger the diaphragm, the more compliant the diaphragm is. Therefore a large diaphragm is more compliant and will experience less back pressure than a smaller diameter diaphragm. Because of problems associated with bringing out leads, which will be further explained, different size diaphragms were traditionally used. One diaphragm was larger in diameter than the other thus resulting in pressure variations that compromised the operation of such devices. The lead problem required that the terminals from the pressure sensor be arranged in a circle about the periphery of the housing, resulting in different diameter diaphragms.

SUMMARY OF THE INVENTION

The various embodiments of the present invention provide a low differential pressure transducer wherein the diaphragms are of substantially the same size and diameter and leads may be brought out from the semiconductor sensor in a simple and expeditious manner.

The pressure transducer of the present invention is comprised of a header having a generally offset cylindrical housing. The offset cylindrical housing has a first section of a first diameter and a second section of a second diameter, wherein the first and second diameter are substantially the same. The first section has a front side and a back side, wherein the front side has a first flexible diaphragm adapted to receive a first pressure. The second section is offset from the first section such that portions of the back side of the first section can be accessed. The second section also has a front side and a back side, wherein the front side has a second flexible diaphragm adapted to receive a second pressure. A channel is positioned within the offset cylindrical housing and extends between the first and second diaphragms. A sensor having a sensing diaphragm is positioned in the channel and the sensing diaphragm communicates with the first and second diaphragms and deflects in accordance with the difference between the first and second pressures.

The resultant device is a low differential pressure transducer that enables leads to be brought out and utilizes diaphragms that are substantially the same size and diameter.

DETAILED DESCRIPTION OF THE INVENTION

Figure 1:
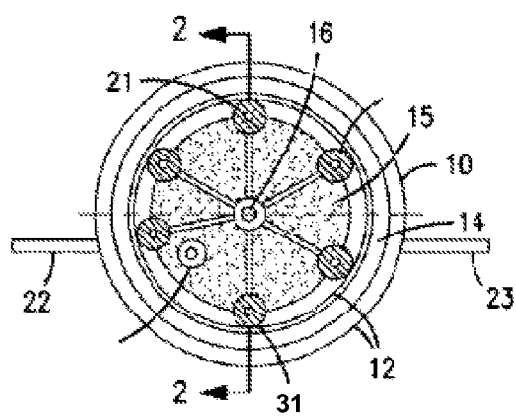
FIG. 1 is a top plan view showing a prior art low pressure differential transducer.
Figure 2:
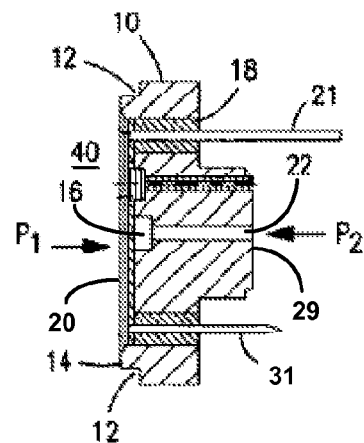
FIG. 2 is a cross-sectional view of the prior art low differential transducer.

Referring to FIGS. 1 and 2 there is shown a prior art low pressure differential pressure transducer. The pressure transducer consists of a metal housing 10 which has a outer peripheral indented flange 12 and a series of concentric rims or flanges 14 and so on. The flanges are configured to accommodate an isolation diaphragm. The diaphragm is not shown in FIG. 1 in order to clarify the presentation. As seen in FIG. 1 there is a first and second oil fill tube 22, 23. The transducer illustrated in FIG. 1 is a differential transducer and, as illustrated in FIG. 2, has a first isolation diaphragm 20, and a second isolation diaphragm 29. The device operates such that when a pressure $P_1$ is applied to the first isolation diaphragm 20, a second pressure $P_2$ is applied to the second isolation diaphragm 29. The transducer has a sensor module 16. The module 16 is an oil filled unit having a piezoresistive Wheatstone Bridge array. When a pressure $P_1$ is applied to the first isolation diaphragm 20 and a pressure $P_2$ is applied to the second isolation diaphragm 29, the pressure $P_2$ is transmitted via channel 22 which is oil filled to the bottom of sensor module 16 while $P_1$ is applied to the top of the module 16. The bridge produces an output proportional to the difference in pressure $P_1$–$P_2$. It is of course understood that FIG. 1 does not show the isolation diaphragms, but FIG. 2 shows both the first and second isolation diaphragms 20, 29. The entire device is oil filled and the pressure $P_1$ is applied to the first isolation diaphragm 20 and a pressure $P_2$ is applied to the second isolation diaphragm 29. There is a ceramic layer 15 which basically covers the central area of the transducer, as shown in FIG. 1. Between the ceramic layer 15 and first isolation diaphragm 20 there is a spacing which is oil filled. When a force $P_1$ is applied to the first isolation diaphragm 20, the sensor 16 will respond as the force is transmitted through the oil. On the low side, or other side, there is the second isolation diaphragm 29 which is also associated with an oil filled cavity and oil filled channel 22 which communicates with the bottom side of the sensor diaphragm and therefore when a pressure $P_2$ is applied to the second isolation diaphragm 29, the pressure is transmitted via the oil in the oil filled channel 22 to the underside of the diaphragm associated with the sensor module 16. In this manner, the sensor, which is a semiconductor device, will produce an output proportional to the difference of $P_1$ and $P_2$, namely the differential pressure.

As shown in FIG. 1 and FIG. 2 the sensor module 16 is associated with wires or output leads 21, 31. In any event, these output leads 21, 31 must be brought out from the device as shown in FIG. 2, and hence the output leads 21, 31 which are coupled to the header by a glass to metal seal 18, are directed through the header 10 at the top area 40. The area 40 is thinner than or a different size than the remaining portion of the header. Because of the need to bring out the leads 21, 31, one has to make the second isolation diaphragm 29 smaller than the first isolation diaphragm 20. As illustrated in FIGS. 1 and 2, the leads 21, 31 from the sensor module 16 have to be brought out to terminal pins. These pins are arranged in a circular pattern and have to extend out without interfering with the oil fill tubes 22, 23. Thus, to do this, the second isolation diaphragm 29 had to be smaller than the first isolation diaphragm 20. The above noted patent application Ser. No. 12/070,255 did not show the proper prior art in FIGS. 1 and 2, but the problem with isolation diaphragm size still was correctly depicted. In this manner as indicated the second isolation diaphragm 29 is not as efficient as the first isolation diaphragm 20. The larger the diaphragm the less the back pressure, and the larger the isolation diaphragm the more compliant the diaphragm is. In any event, in the prior art the isolation diaphragms are of different sizes whereby the second isolation diaphragm 29 associated with pressure $P_2$ is smaller than the first isolation diaphragm 20 associated with pressure $P_1$. This is necessary to allow the leads 21, 31 to clear and to be brought out. It is understood that if the leads were brought out in any other manner they would have to go through or somehow avoid the second isolation diaphragm 29, the oil tubes 22, 23, and so on, making it a difficult problem.

Figure 3:
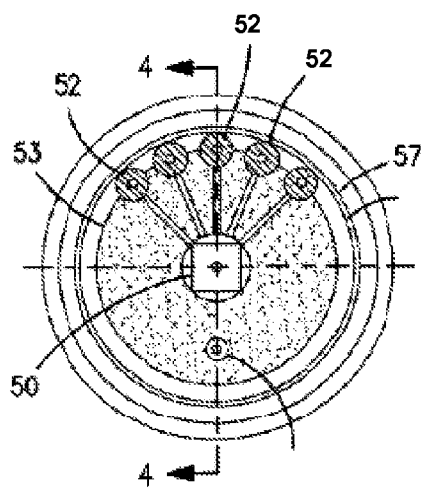
FIG. 3 is a top plan view of a transducer according to an aspect of the present invention.

Referring to FIG. 3, there is shown a top plan view of a low pressure differential transducer according to this invention. Essentially the top plan view of FIG. 3 shows the pins arranged in a semi-circle configuration. By arranging the pins in a semi-circle, one can bring out all the leads 52 from the sensor module 50, avoid interference with the oil fill tubes, and allow both isolation diaphragms to be the same size. The transducers of the present invention incorporate the semi-circle pin arrangement as illustrated in FIG. 3 and further enable the diaphragms to be of substantially the same size and diameter, therefore minimizing the differences in back pressure and maximizing compliance.

Figure 4:
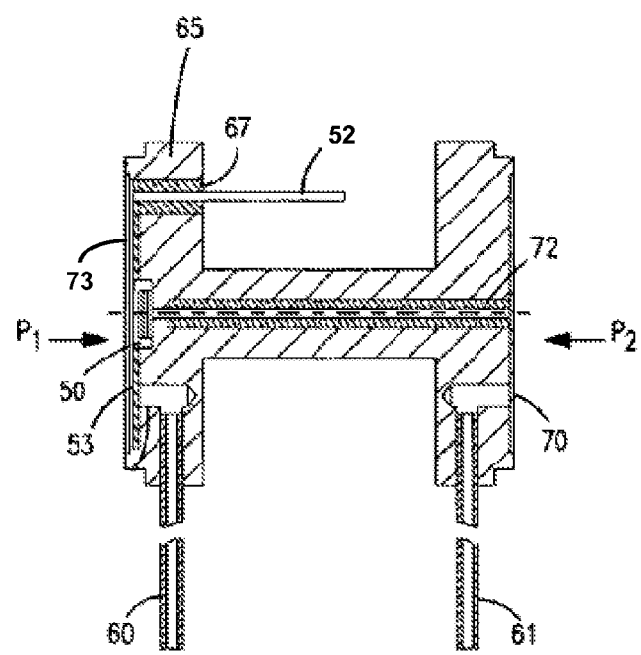
FIG. 4 is a cross-sectional view of a transducer having a dumbbell-shaped header according to an aspect of the present invention.

FIG. 4 is a cross-sectional view of a transducer having a dumbbell-shaped header according to an aspect of the present invention. The sensor module 50 is located at the center but can also be positioned off center if desired. The sensor module 50 is associated with leads 52 which are wire-bonded leads which have to be brought out. There is shown a ceramic layer 53 having a central aperture surrounding the sensor module 50. The sensor module 50 responds to pressure when a pressure is applied to the diaphragm. The spacing between the backside of the diaphragm and the ceramic layer 53 is oil-filled and, as shown in FIG. 4, the device has two oil-filled tubes 60, 61. Oil flows through the tubes into the spacing between the ceramic layer 53 and the first isolation diaphragm 73 and into the space adjacent second isolation diaphragm 70 into channel 72. As previously mentioned, the header 65 is dumbbell-shaped and in this manner the leads, for example leads 52, are positioned in the housing by means of a glass to metal seal 67. Due to the overall shape of the header 65, the leads 52 can be brought out as indicated while the second isolation diaphragm 70 is of the same size and diameter as the first isolation diaphragm 73. There is also the channel 72, which is oil-filled and which communicates with the backside of the sensing module 50 to enable the pressure $P_2$ to be directed to the second isolation diaphragm 70 while pressure $P_1$ is directed to the first isolation diaphragm 73 and therefore the sensor module provides an output proportional to the difference between pressures $P_1$ and $P_2$. The embodiment illustrated in FIG. 4 enables the leads to be brought out and enables the first and second isolation diaphragms 73, 70 to be of substantially the same size and diameter. This results in a more uniform operation of the transducer because both diaphragms have the same back pressure and are similarly compliant.

In some applications, the dumbbell-shaped header of FIG. 4 may not be preferred due to the relatively large amount of oil that must be used in the oil channel 72 to connect the first and second isolation diaphragms 73, 70. This large oil channel 72 may be sensitive to gravity and vibration. It may therefore be desirable to decrease the amount of oil used, which will in turn prevent the effect of gravity and vibration sensitivity currently in the oil channel 72. The pressure transducer illustrated in FIG. 8 achieves this goal by reducing the length of the channel. This configuration utilizes less oil, however still enables leads to be brought out and the diaphragms to be of substantially the same size and diameter.

Figure 8:
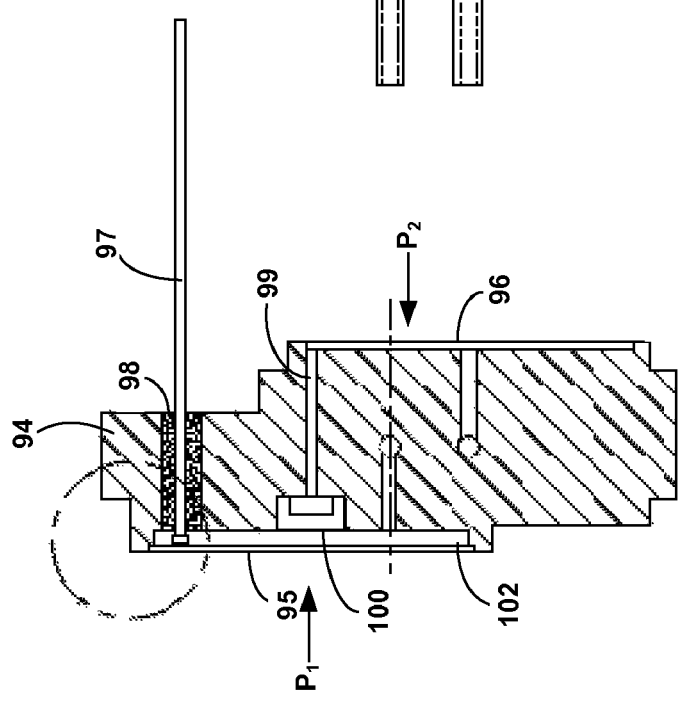
FIG. 8 is a cross-sectional view of a transducer having an offset header according to an aspect of the present invention.

FIG. 8 is a cross-sectional view of a transducer having an offset header according to an exemplary embodiment of the present invention. The header, which may be made of metal, comprises a cylindrical housing section 94 having a first section 95 and a second section 96. The first section 95 and second section 96 are offset from each other such that the back of the first section 95 can be accessed by leads 97. Like the transducer illustrated in FIG. 4, the leads 97 are positioned in the cylindrical housing section 94 by means of a glass to metal seal 98. The first 95 and second 96 sections each have a flexible diaphragm, which deflects in accordance with an applied pressure. The flexible diaphragm may be fabricated using a metal or other suitable material. A first pressure, $P_1$, is directed to the diaphragm of the first section 95 and a second pressure, $P_2$, is directed to the diaphragm of the second section 96. A channel 99 extends between the first and second diaphragms and a sensor module 100 having a sensing diaphragm is positioned inside the channel. The length of the channel 99 can be shorter than the length of the channel 72 shown in FIG. 4, and therefore requires less oil for operation. The sensing diaphragm communicates with the diaphragms and deflects in accordance with the difference between the first and second pressures, $P_1$–$P_2$.

Figure 9:
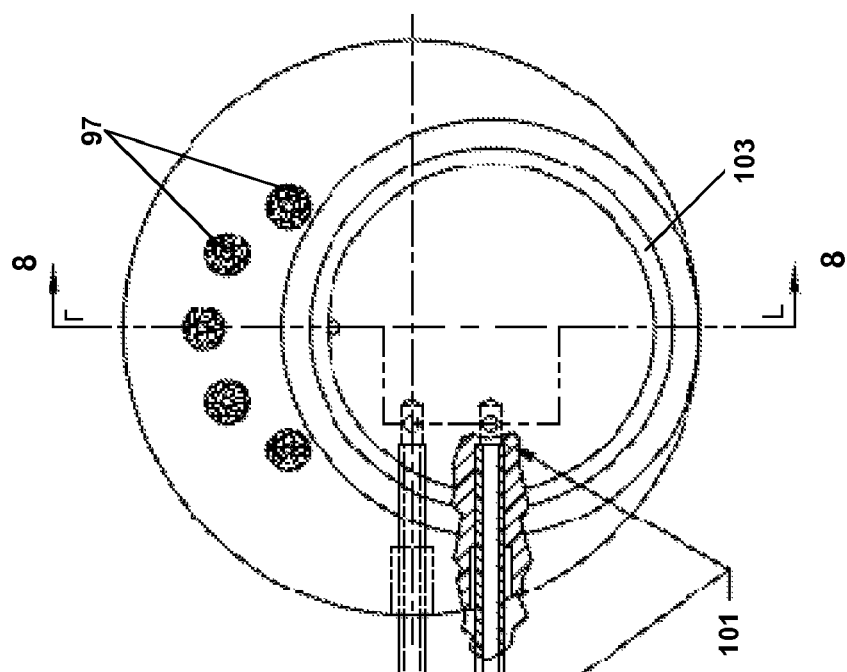
FIG. 9 is a top plan view of a transducer having an offset header according to an aspect of the present invention.

FIG. 9 is an illustration of a top plan view of the offset header. As illustrated, the pins are arranged in a semi-circle pattern thus enabling one to bring out the leads 97 without interfering with the diaphragms of the first 95 and second 96 sections or the oil filled tubes 101. Like the oil filled tubes 60, 61 in FIG. 4, oil flows through the tubes 101 into the space between the ceramic layer 102 and the diaphragm of the first section 95 and into the space adjacent the diaphragm of the second section 96 into the channel 99.

Figure 5:
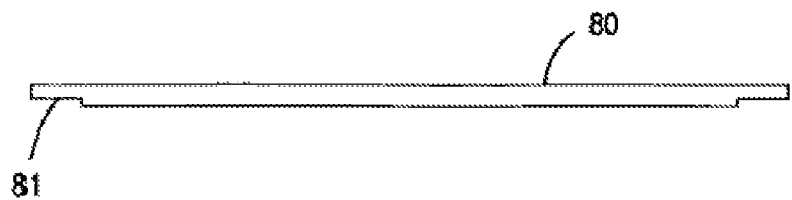
FIG. 5 is a cross-sectional view of a diaphragm according to an aspect of the present invention.

Referring to FIG. 5, there is shown a cross-sectional view of a typical isolation diaphragm 80, which is the type of diaphragm employed in FIG. 2 as first and second isolation diaphragms 20, 29, in FIG. 4 as isolation diaphragms 73 and 70, and in FIG. 8 as diaphragms of the first and second sections 95, 96. The diaphragm 80 is preferably thin and preferably made of metal and further, has a peripheral flange 81 whereby the diaphragm is positioned as shown in FIGS. 1, 3, and 9 between the ridges 14, 57, 103, respectively.

Figure 6:
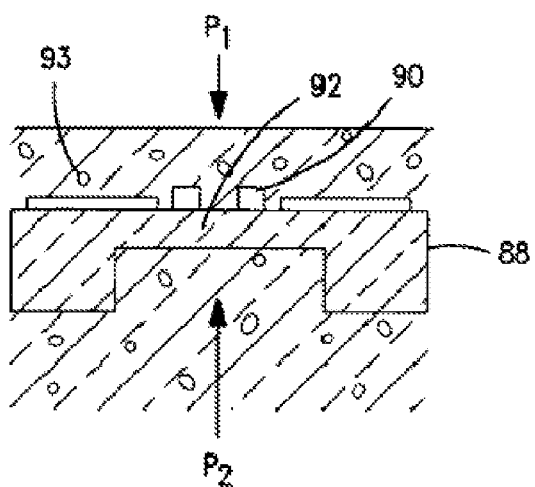
FIG. 6 is a cross-sectional view of a pressure sensor employing piezoresistors according to an aspect of the present invention.

Referring to FIG. 6, there is shown a schematic cross-sectional view of a typical sensor module for both the dumb-bell-shaped and offset headers. The sensor module contains a semiconductor substrate 88 having a thin active area or diaphragm 92 upon which piezoresistors 90 are positioned. The sensor can be protected by coating it with a layer of silicon dioxide and essentially the pressure $P_1$ is applied to the top of the sensor active area or diaphragm 92. The pressure is transmitted to the sensor by the oil 93 which fills the cavity above the sensor as for example, shown in FIGS. 2, 4 and 8. The sensor has the underside of the diaphragm 92 subjected to pressure $P_2$ via channel 72 or 99 and therefore, as indicated, produces an output pressure indicative of the differential pressure between $P_1$ and $P_2$.

Figure 7:
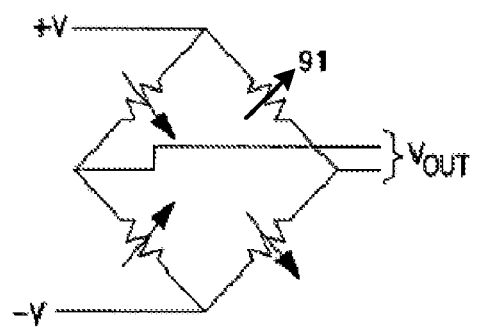
FIG. 7 is a schematic diaphragm of Wheatstone Bridge such as the type employed on the sensor of FIG. 6 and used in explaining the present invention.

FIG. 7 illustrates a Wheatstone Bridge configuration having four resistors 91, which may be piezoresistors. One skilled in the art will appreciate that the resistance of the resistors 91 change according to an applied pressure. Also illustrated in FIG. 7 are four leads associated with the Wheatstone Bridge, two of the leads bias the bridge and two provide an output. In prior art embodiments, such as those illustrated in FIGS. 1 and 2, five leads were generally utilized so that one lead could perform as a separate ground reference lead. Irrespective of the number of leads utilized for the bridge, each lead must be brought out from the device. The various embodiments of the present invention may be desirable over the prior art because each embodiment enables the leads to be brought out and the first and second diaphragms to be of substantially the same diameter and size. This configuration results in improved operation of pressure transducers as compared to prior art devices.

It should be apparent to one skilled in the state of the art that there are many alternate embodiments within the spirit and the claims appended hereto.

The invention claimed is:

1. A pressure transducer, comprising:
   a header having a housing of generally offset cylindrical shape, the housing having a first section of a first diameter and a second section of a second diameter wherein the first and second diameter are substantially the same,
   the first section having a front side and a back side, wherein the front side of the first section has a first flexible diaphragm adapted to receive a first pressure,
   the second section having a front side and a back side, wherein the front side of the second section has a second flexible diaphragm adapted to receive a second pressure, and further wherein the second section is offset from the first section of the housing such that portions of the back side of the first section are accessible,
   a channel positioned within the offset cylindrical housing that extends between said first and second diaphragms, and
   a sensor having a sensing diaphragm positioned in said channel wherein the sensing diaphragm communicates with the first diaphragm and the second diaphragm and deflects in accordance with the difference between the first and second pressures.

2. The pressure transducer according to claim 1, wherein said header is fabricated from a metal.

3. The pressure transducer according to claim 1, wherein said first and second diaphragms are fabricated from a metal.

4. The pressure transducer according to claim 1, further including a pressure transmitting fluid filling said channel and said diaphragms to allow pressure to be applied to said sensor via said fluid.

5. The pressure transducer according to claim 4, wherein said fluid is oil.

6. The pressure transducer according to claim 1, wherein said sensor is a semiconductor sensor having a diaphragm area which deflects upon application of a force thereto.

7. The pressure transducer according to claim 1, wherein said sensor has a Wheatstone Bridge including at least one piezoresistor located thereon.

8. The pressure transducer according to claim 1, wherein one or more electrical leads are connected to the back side of the first section.

9. The pressure transducer according to claim 8, wherein the one or more electrical leads are arranged in a semi-circular configuration.

10. The pressure transducer according to claim 8, wherein the one or more electrical leads from said sensor are directed to pins in one arm of said front section.

11. A pressure transducer, comprising:
    a first section of a first diameter;
    a second section of a second diameter, wherein the first and second diameter are substantially the same,
    the first section having a front side and a back side, wherein the front side of the first section has a first flexible diaphragm adapted to receive a first pressure,
    the second section having a front side and a back side, wherein the front side of the second section has a second flexible diaphragm adapted to receive a second pressure, and further wherein the second section is offset from the first section such that portions of the back side of the first section are accessible,
    a channel that extends between said first and second diaphragms, and
    a sensor having a sensing diaphragm positioned in said channel wherein the sensing diaphragm communicates with the first diaphragm and the second diaphragm and deflects in accordance with the difference between the first and second pressures.

12. The pressure transducer according to claim 11, wherein said first and second diaphragms are fabricated from a metal.

13. The pressure transducer according to claim 11, further including a pressure transmitting fluid filling said channel and said diaphragms to allow pressure to be applied to said sensor via said fluid.

14. The pressure transducer according to claim 13, wherein said fluid is oil.

15. The pressure transducer according to claim 11, wherein said sensor is a semiconductor sensor having a diaphragm area which deflects upon application of a force thereto.

16. The pressure transducer according to claim 11, wherein said sensor has a Wheatstone Bridge including at least one piezoresistor located thereon.

17. The pressure transducer according to claim 11, wherein one or more electrical leads are connected to the back side of the first section.

18. The pressure transducer according to claim 17, wherein the one or more electrical leads are arranged in a semi-circular configuration.

19. The pressure transducer according to claim 17, wherein the one or more electrical leads from said sensor are directed to pins in one arm of said front section.

\* \* \* \* \*